United States Patent [19]

Nighan, Jr. et al.

[11] Patent Number: 5,325,393

[45] Date of Patent: Jun. 28, 1994

[54] DUAL LASER RESONATOR AND BEAM COMBINER

[75] Inventors: William L. Nighan, Jr., Rocky Hill; Darin Y. Ursuliak, East Windsor, both of N.J.

[73] Assignee: Carl Zeiss, Inc., Thornwood, N.Y.

[21] Appl. No.: 973,160

[22] Filed: Nov. 6, 1992

[51] Int. Cl.$^5$ .................. H01S 3/082; A61N 5/06
[52] U.S. Cl. .......................... 372/97; 372/23; 372/32; 372/92; 372/99; 606/3; 606/11; 606/15; 606/16; 606/18
[58] Field of Search .......... 372/18, 23, 32, 69, 372/70, 72, 92, 97, 100, 99, 107; 606/1, 2, 3, 4, 5, 6, 15, 16, 18, 10, 11

[56] References Cited

U.S. PATENT DOCUMENTS

| | | | |
|---|---|---|---|
| 4,069,823 | 1/1978 | Isakov et al. | 606/1 X |
| 4,503,854 | 3/1985 | Jako | 606/3 X |
| 4,550,240 | 10/1985 | Toida et al. | 219/121 LS |
| 4,573,465 | 3/1986 | Sugiyama et al. | 372/23 X |
| 4,672,969 | 6/1987 | Dew | 606/3 X |
| 4,866,720 | 9/1989 | Holly | 372/23 |
| 4,868,835 | 9/1989 | Iwanade | 372/99 |
| 4,940,411 | 7/1990 | Vassiliadis et al. | 606/16 X |
| 4,951,663 | 8/1990 | L'Esperance, Jr. | 606/13 X |
| 4,955,027 | 9/1990 | Piper et al. | 372/18 |
| 4,982,166 | 1/1991 | Morrow | 330/4.3 |
| 5,002,051 | 3/1991 | Dew et al. | 606/12 X |
| 5,048,034 | 9/1991 | Tulip | 372/41 |
| 5,105,428 | 4/1992 | Pocholle et al. | 372/24 |
| 5,157,683 | 10/1992 | Millar et al. | 372/71 |
| 5,207,576 | 5/1993 | Vassiliadis et al. | 606/18 X |
| 5,210,765 | 5/1993 | Flint et al. | 372/23 |

OTHER PUBLICATIONS

S. Wong, P. Pace, P. Mathieu, and J. Tulip; "A Long Wavelength Nd:YAG Laser" DREV Report 1990, pp. 501–509.

S. K. Wong, P. Mathieu, P. Pace; "Eye-Safe Nd:YAG Laser" Appl. Phys. Lett., vol. 57, pp. 650–652, Aug. 1990.

J. Marling "1.05–1.44 μm Turnability and Performance of the CW Nd$^{3+}$:YAG Laser", IEEE J. Quantum Electronics, vol. QE-14, No. 1, Jan. 1978, pp. 56–62.

Primary Examiner—Brian Healy
Attorney, Agent, or Firm—Michael B. Einschlag

[57] ABSTRACT

Apparatus for providing beams of laser radiation at wavelengths of 1.44 μm and 1.064 μm on demand. Two Nd:YAG lasers are arranged in a side-by-side configuration and operated to provide laser output at wavelengths of 1.44 μm and 1.064 μm, respectively. In the preferred embodiment, a reflective spectral filter comprised of two reflectors reduces the amount of 1.064 μm radiation in the output beam from the 1.44 μm laser by a factor of 100 to 1000, but only reduces the amount of 1.44 μm radiation in the output beam from the laser by less than 2%. The apparatus also provides collinear addition of the output from the 1.064 μm laser. This collinear addition enables output radiation from both lasers to be coupled together into a single optical fiber. In fact, a user can choose to operate either laser separately or to operate both lasers simultaneously.

15 Claims, 1 Drawing Sheet

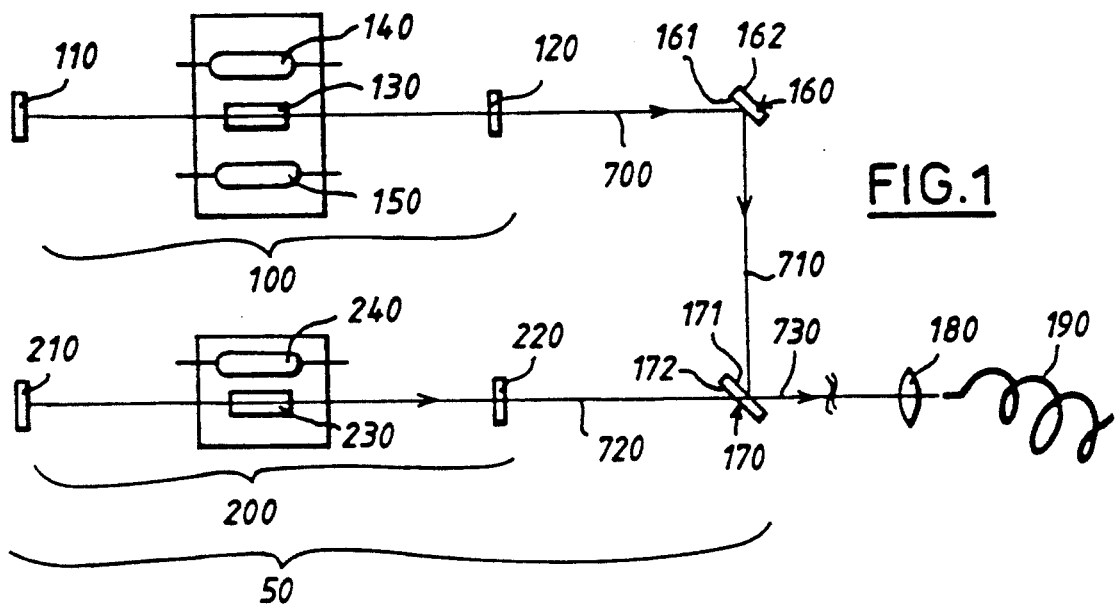
FIG.1
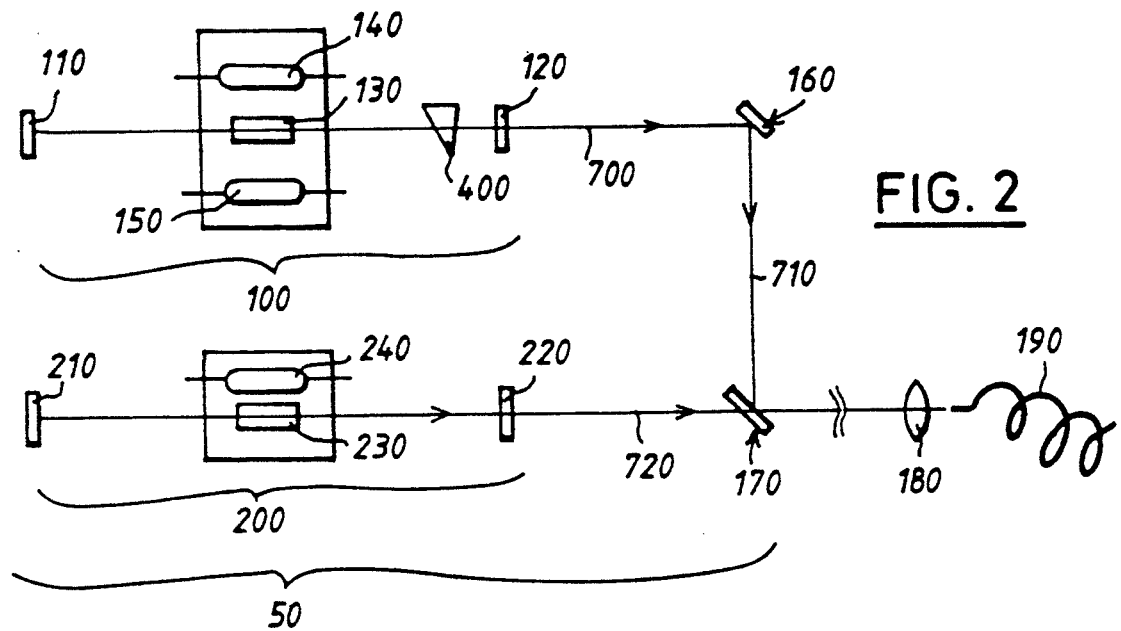
FIG. 2
FIG.3
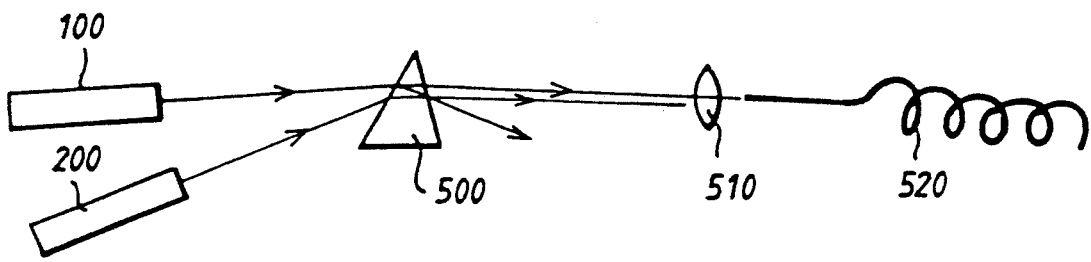

DUAL LASER RESONATOR AND BEAM COMBINER

TECHNICAL FIELD OF THE INVENTION

The present invention pertains to a dual laser resonator and beam combinet.

BACKGROUND OF THE INVENTION

It is known in the art that a standard neodymium doped YAG (Nd:YAG) laser crystal can be used to build a laser that emits radiation at a wavelength of 1.44 μm with reasonable efficiency. This wavelength is useful in a variety of applications. For example, the high absorption coefficient of water for radiation at a wavelength of 1.44 μm ($-26$ cm$^{-1}$) allows efficient coupling of radiation at this wavelength to biological tissue in surgical applications, and the radiation at a wavelength of 1.44 μm is also classified as "eye-safe." Although these same characteristics can be associated with Cr,Tm, Ho:YAG lasers operating near 2.1 μm, the opportunity to base a laser system upon the standard Nd:YAG technology provides several technological advantages. For example, laser efficiency drops significantly with increasing temperature in the Cr,Tm,Ho:YAG materials, thereby limiting the efficiency of such lasers in high average power applications. In particular, it is known that the average power of a pulsed Ho:YAG laser does not increase linearly as repetition rate is increased. This occurs as a result of the small energy difference between the lower level of laser transitions and the ground level in Cr,Tm,Ho:YAG. Such a characteristic does not apply to Nd:YAG and the problems associated with elevated temperature are, therefore, much less severe in Nd:YAO than in Cr,Tm,Ho:YAG.

The strongest emission line in Nd:YAG is at 1.064 μm and efficient lasers at this wavelength have been widely used in a variety of applications. Indeed, in order to obtain reasonably efficient oscillation at 1.44 μm with Nd:YAG it is required: (1) to suppress oscillation at wavelengths other than 1.44 μm which can deplete the upper level of the 1.44 μm transition and (2) to operate the 1.44 μm laser well above threshold. One consequence of this is that it is essential to suppress oscillation at 1.064 μm. The first requirement above arises from the fact that the gain cross section at 1.44 μm is low and, in particular, it is approximately ten times less than that at 1.064 μm in this material. In addition, oscillation at 1.32-1.36 μm must also be suppressed. As a result, feedback of all of these wavelengths into the excited laser crystal must be kept much lower than that at 1.44 μm.

The second requirement above arises from the fact that the low gain cross section at 1.44 μm also leads to a high threshold for laser oscillation at 1.44 μm.

In spite of taking the above requirements into account, a significant fraction of the output power from a multimode 1.44 μm Nd:YAG laser may be radiation at a wavelength of 1.064 μm. In fact, if a 1.44 μm resonator is misaligned, the relative ratio between output at 1.064 μm and 1.44 μm can become very large, for example, the power at 1.44 μm can go to zero while the 1.064 μm output rises significantly. Such a happenstance, i.e., the emission of radiation at a wavelength of 1.064 μm at a time when radiation at a wavelength of 1.44 μm is expected by a user, is undesirable and possibly dangerous in some applications since the interaction between biological tissue and laser radiation differs significantly for radiation at these two wavelengths. However, it would be desirable for the user to be able to choose either wavelength on demand since both are known to be useful. For example, 1.44 μm radiation is useful for incising and ablating biological tissue whereas 1.064 μm radiation is useful for coagulating blood and, therefore, for providing hemostasis.

In light of the above, there is a need for a method of reducing the amount of spurious radiation from a 1.44 μm laser and for a laser system for providing beams of radiation at wavelengths of 1.44 μm and 1.064 μm on demand.

SUMMARY OF THE INVENTION

Embodiments of the present invention advantageously satisfy the above-identified need in the art and provide a laser system for providing beams of radiation at wavelengths of 1.44 μm and 1.064 μm on demand.

In particular, a preferred embodiment of the present invention is apparatus comprised of two Nd:YAG lasers which are arranged in a side-by-side configuration and which are operated to provide laser output at wavelengths of 1.44 μm and 1.064 μm, respectively. In the preferred embodiment, a reflective spectral filter comprised of two reflectors reduces the amount of 1.064 μm radiation in the output beam from the 1.44 μm laser by a factor of 100 to 1000, but only reduces the amount of 1.44 μm radiation in the output beam from the laser by less than 2%. The apparatus also provides collinear addition of the 1.44 μm output with output from the 1.064 μm laser. This collinear addition enables output radiation from both lasers to be coupled together into a single optical fiber.

In particular, embodiments of the present invention, comprise: a first radiation source which provides a first beam comprised of radiation at a first wavelength and a second wavelength; a second radiation source which provides a second beam comprised of radiation at a third wavelength; a first optical means, disposed in the path of the first beam, for reflecting a substantial portion of the radiation at the first wavelength and for transmitting a substantial portion of the radiation at the second wavelength; and a second optical means, disposed in the path of the second beam and the reflected radiation at the first wavelength, for reflecting a substantial portion of the radiation at the first wavelength and for transmitting a substantial portion of the radiation at the third wavelength.

BRIEF DESCRIPTION OF THE DRAWINGS

A complete understanding of the present invention may be gained by considering the following detailed description together with the accompanying drawings, in which:

FIG. 1 shows, in pictorial form, a preferred embodiment of the present invention is a laser system which provides beams at 1.44 μm and 1,064 μm on demand;

FIG. 2 shows, in pictorial form, a first alternative embodiment of the present invention which provides beams at 1.44 μm and 1.064 μm on demand; and FIG. 3 shows, in pictorial form, a second alternative embodiment of the present invention which provides beams at 1.44 μm and 1.064 μm on demand.

Corresponding elements in each of the drawings have the same reference numbers.

DETAILED DESCRIPTION

FIG. 1 shows, in pictorial form, preferred embodiment 50 of the present invention which is a laser system for providing beams at wavelengths of 1.44 μm and 1,064 μm on demand.

In the preferred embodiment of the present invention shown in FIG. 1, lasers 100 and 200 are arranged in a side-by-side configuration and provide laser output at wavelengths of 1.44 μm and 1,064 μm, respectively. Since the most efficient operation for most lasers is achieved well above threshold, laser 100 is driven with pulses of high peak power to provide efficient operation at 1.44 μm in Nd:YAG crystal 130. In the preferred embodiment, flashlamps 140 and 150 are used to pump laser 100 and energy is delivered to each lamp in a manner which is well known to those of ordinary skill in the art by discharging a capacitor in a simple pulse forming network (not shown). As a result, lamp-driven laser 100 operates most efficiently in a pulsed mode to produce multimode output energies at a wavelength of 1.44 μm of as high as 4J in energy. Further, we have determined that laser 100 produces output radiation at 1.44 μm and also produces some amount of output radiation at 1,064 μm. A reflective spectral filter comprised of reflectors 160 and 170 which is fabricated in accordance with the present invention reduces the amount of 1.064 μm radiation in output beam 730 by a factor of 100 to 1000 with respect to beam 700 from laser 100, but only reduces the amount of 1.44 μm radiation in output beam 730 by less than 2% with respect to beam 700 from laser 100.

Advantageously, the preferred embodiment of the present invention shown in FIG. 1 also provides collinear addition of the beam of laser 200 which produces output radiation at a wavelength of 1,064 μm. This collinear addition allows output beams 700 and 720 from lasers 100 and 200, respectively, to be coupled together into single optical fiber 190. In fact, by utilizing switches (not shown), a user can choose to operate either laser 100 or laser 200, or to operate both lasers 100 and 200 simultaneously. Further, the outputs from lasers 100 and 200 can be delivered to a location for application, for example, in a surgical procedure, with an optical fiber. In the preferred embodiment of the present invention for use in surgical procedures, 1.44 μm laser 100 is driven in a pulsed mode in a manner which is well known to those of ordinary skill in the art while 1.064 μm laser 200 is driven in a continuous wave mode in a manner which is well known to those of ordinary skill in the art. Thus, the user may choose to obtain: (a) pulsed 1.44 μm radiation for use in incision and ablation; (b) continuous 1.064 μm radiation for use in coagulation and hemostasis; or (c) simultaneous pulsed 1.44 μm radiation and continuous 1.064 μm radiation for a superposition of the effects produced by such radiation.

FIG. 1 shows, in pictorial form, lasers 100 and 200 which provide laser output radiation at wavelengths of 1.44 μm and 1,064 μm, respectively. As shown in FIG. 1, a resonator for laser 100 is comprised of cavity mirrors 110 and 120 and ND:YAG crystal 130 is disposed within the laser resonator formed by cavity mirrors 110 and 120. Further, Nd:YAG crystal 130 is pumped by flashlamps 140 and 150 in a manner which is well known to those of ordinary skill in the art. In the preferred embodiment, flashlamps 140 and 150 are driven by pulse forming networks (not shown), the capacitors of which are charged by a switching power supply (not shown) which is well known to those of ordinary sill in the art. We have determined that, as a result of pumping, laser 100 produces laser output radiation at 1.44 μm and 1.064 μm and that the ratio of radiation at these wavelengths depends on pump power. Radiation which is emitted from laser 100 as beam 700 impinges upon first surface 161 of reflector 160 and is reflected as beam 710 towards reflector 170. Beam 710 is then reflected by first surface 171 of reflector 170. In accordance with the present invention, first surface 161 of reflector 160 has a reflectivity of greater than approximately 99% at a wavelength of 1.44 μm and a reflectivity of less than approximately 10% at a wavelength of 1.064 μm. Further in accordance with the present invention, first surface 171 of reflector 170 has a reflectivity of greater than approximately 99% at a wavelength of 1.44 μm and a reflectivity of less than approximately 10% at a wavelength of 1.064 μm. Of course those of ordinary skill in the art will readily appreciate that the combination of reflectors 160 and 170 can be achieved for either s or p polarized light or for randomly polarized light. Lastly, the radiation obtained after reflection by reflector 170 may be focused by lens system 180 for coupling to optical fiber 190.

FIG. 1 also shows, in pictorial form, laser 200 which produces laser output radiation at 1.064 μm. As shown in FIG. 1, a resonator for laser 200 is comprised of cavity mirrors 210 and 220 and ND:YAG crystal 230 is disposed within the laser resonator formed by cavity mirrors 210 and 220. Further, Nd:YAG crystal 230 is pumped by arc lamp 240 in a manner which is well known to those of ordinary skill in the art. In the preferred embodiment, arc lamp 240 is driven in a continuous mode by a switching power supply (not shown) which is well known to those of ordinary skill in the art, which switching power supply is configured as a current source in a manner which is well known to those of ordinary skill in the art. Radiation which is emitted from laser 200 as beam 720 impinges upon reflector 170 and is mostly transmitted to lens system 180.

In the preferred embodiment of the present invention, cavity mirror 110 of laser 100 has the following properties for approximately 0° degrees incidence: high reflectance at 1.44 μm (reflectance at 1.44 μm > approximately 99%); high transmittance at 1.064 μm (reflectance at 1.064 μm < approximately 10%); and high transmittance at 1.310–1.360 μm (reflectance at 1.310–1.360 μm < approximately 40%). In the preferred embodiment of the present invention, cavity output mirror 120 of laser 100 has the following properties for approximately 0° degrees incidence: approximately 75% reflectivity output coupler at 1.44 μm (reflectance at 1.44 μm = 75% ± 2%); high transmittance at 1,064 μm (reflectance at 1.064 μm < 10%); and high transmittance at 1,310–1.360 μm: (reflectance at 1.310–1.360 μm < 40%). As is well known to those of ordinary skill in the art, the radii of curvature of the cavity mirrors are chosen in accordance with thermal lens parameters and desired output beam characteristics.

The properties of suitable resonator mirrors for 1.064 μm laser 200 are well known to those of ordinary skill in the art. Further, those of ordinary skill in the art readily appreciate that although we are utilizing the terms 1.44 μm radiation and 1,064 μm radiation these terms refer to radiation substantially at these wavelengths and in reasonably suitable ranges thereabout.

In the preferred embodiment of the present invention, reflectors 160 and 170 comprise dichroic mirrors 160 and 170 which are mounted at approximately 45° degree angles to the optic axes of lasers 100 and 200, respectively. Dichroic mirrors 160 and 170 have the following properties. The substrates of reflectors 160 and 170 are fabricated of a material that is transparent to radiation at wavelengths substantially equal to 1.06 μm. For first surfaces 161 and 171 of dichroic mirrors 160 and 170, respectively, at approximately 45° degrees incidence: high reflectance at 1.44 μm, for polarizations p and s (reflectance at 1.44 μm, polarization p>99.0% and reflectance at 1.44 μm, polarization s>99.7%) and high transmittance at 1,064 μm, for polarizations p and s (reflectance at 1,064 μm, polarization p<10.0% and reflectance at 1,064 μm, polarization s<10.0%). For second surfaces 162 and 172 of dichroic mirrors 160 and 170, respectively, at approximately 45° degrees incidence: narrow band antireflection coating at 1.064 μm (reflectance at 1,064 μm, polarization p<0.5% and reflectance at 1,064 μm, polarization s<0.5%). As a result of this, advantageously, most of the 1.44 μm wavelength radiation in beam 700 output from laser 100 is reflected from mirror 160 and most of the 1,064 μm wavelength radiation in beam 700 is transmitted through mirror 160 while most of the 1.44 μm radiation in beam 710 is reflected from mirror 170 and most of the remaining 1,064 μm radiation in beam 710 is transmitted through mirror 170. Those of ordinary skill in the art will readily appreciate that mirrors 160 and 170 may also be designed for use at angles other than at approximately 45° degrees incidence.

In the preferred embodiment of the present invention, beam 700 emitted by 1.44 μm laser 100 is reflected from mirror 160 at ~45° degrees incidence as beam 710 with less than 1% loss at 1.44 μm. Further, beam 710 is then reflected from mirror 170 at ~45° degrees incidence with less than 1% additional loss at 1.44 μm. Thus, the overall loss in the 1.44 μm portion of beam 700 is typically less than 2% after these two reflections. Further, any undesired 1,064 μm radiation in beam 700 emitted from laser 100 is reduced by a factor of 100 to 1000. As a result, the use of mirrors 160 and 170 has advantageously removed 1.064 μm radiation from the output of laser 100. The reflectance of each of combining mirrors 160 and 170 is less than 10% at 1,064 μm. The low reflectance at 1,064 μm for mirror 170 is also advantageously used for transmission of beam 720 emitted by 1,064 μm laser 200. In particular, beam 720 is transmitted through mirror 170 with less than 10% power loss. Lastly, mirrors 160 and 170 are aligned in a manner which is well known to those of ordinary skill in the art to provide that the 1.44 μm beam 710 reflected from mirror 160 and 1,064 μm beam 720 emitted by laser 200 emerge collinearly from system 50. Advantageously, both beams, i.e., 1.44 μm wavelength radiation in beam 710 and 1,064 μm beam 720, are coupled to the same optical fiber, i.e., optical fiber 190. This advantageously allows a user to select either wavelength for delivery through the same optical fiber delivery system. Further, it should be clear to those of ordinary skill in the art that one may utilize two independent power supplies for driving lasers 100 and 200 so as to provide individual or simultaneous excitation thereof. In addition, one may utilize a single power supply for driving lasers 100 and 200 independently or simultaneously.

As shown in FIG. 1, lasers 100 and 200 are built, side-by-side, each with its own laser rod, laser rods 130 and 230, respectively. This is advantageous in that it permits one to optimize each laser independently in a manner which is well known to those of ordinary skill in the art with respect to laser rods 130 and 230; cavity mirrors (110, 120) and (210, 220), respectively; lamps (140, 150) and (240), respectively; lamp driving characteristics; and pump cavities. In the preferred embodiment of the present invention, the pump cavities of lasers 100 and 200 are disposed in the same water-cooled housing.

FIG. 2 shows in pictorial form a first alternative embodiment of the present invention. As shown in FIG. 2, prism 400 is inserted in the cavity of laser 100. Prism 400 is designed in a manner which is well known to those of ordinary skill in the art, so that 1.064 μm radiation which is excited in the cavity of laser 100 is directed out of the cavity. This provides a benefit in that it further reduces 1.064 μm radiation in the mainly 1.44 μm output from laser 100.

FIG. 3 shows, in pictorial form, a second alternative embodiment of the present invention. As shown in FIG. 3, lasers 100 and 200 are not aligned substantially parallel to each other as was the case for the embodiment shown in FIG. 1. In FIG. 3, the output from lasers 100 and 200 emerge at an angle and impinge upon prism 500. Prism 500 is designed in a manner which is well known to those of ordinary skill in the art so that 1.44 μm radiation impinging thereon from laser 100 is directed to lens 510 and, in turn, thereby to optical fiber 520. Further, prism 500 is designed so that 1,064 μm radiation impinging thereon from laser 100 is directed away from lens 520. Finally, prism 520 is designed so that 1.064 μm radiation impinging thereon from laser 200 is directed to lens 510 and, in turn, thereby to optical fiber 520.

We have described the present invention in an embodiment wherein laser 100 outputs radiation at a first wavelength substantially equal to 1.44 μm and radiation at a second wavelength substantially equal to 1.064 μm. However, it should be understood that the radiation at a second wavelength may also comprise radiation of several wavelengths. For example, the radiation at the second wavelength may comprise radiation at the following wavelengths: 1.32 μm, 1.34 μm, and/or 1.36 μm. Of course, in the preferred embodiment described above, the radiation at the second wavelength is predominantly radiation at a wavelength substantially equal to 1.064 μm.

It is to be appreciated and understood that the specific embodiments of the invention described hereinbefore are merely illustrative of the general principles of the invention. Various modifications may be made by those skilled in the art consistent with the principles set forth hereinbefore. For example, although embodiments have been described with references to FIGS. 1 and 2 wherein lasers 100 and 200 have been aligned in a side-by-side arrangement, embodiments of the present invention are not limited to such an arrangement. It is considered within the scope of the present invention to fabricate embodiments wherein lasers 100 and 200 have other alignments and wherein the radiation output therefrom is directed by optical means which are well known to those of ordinary skill in the art, along with other alignments of mirrors 160 and 170, to achieve the advantageous function achieved above with respect to the embodiments shown in FIGS. 1 and 2. As a further example, it is considered within the scope of the present invention to fabricate embodiments wherein reflector 170 is mounted on a translation stage that provides removal of reflector 170 from the path of beam 720 from laser 200 whenever beam 720 is desired by a user. Such an arrangement advantageously avoids the imposition of loss on beam 720 before coupling to fiber 190 or any other application. In addition, reflector 160 may be similarly mounted on the same translation stage as reflector 170 to reduce alignment problems.

What is claimed is:

1. Apparatus which comprises:
   a first radiation source which provides a first beam comprised of radiation substantially at a first wavelength and substantially at a second wavelength;
   a second radiation source which provides a second beam comprised of radiation substantially at a third wavelength; and
   optical means, disposed in the path of the first beam and the second beam, for substantially separating the radiation substantially at the first wavelength and substantially at the second wavelength from the first beam and for combining the substantially separated radiation substantially at the first wavelength from the first beam with radiation substantially at the third wavelength from the second beam.

2. Apparatus which comprises:
   a first radiation source which provides a first beam comprised of radiation substantially at a first wavelength and substantially at a second wavelength;
   a second radiation source which provides a second beam comprised of radiation substantially at a third wavelength;
   a first optical means, disposed in the path of the first beam, for reflecting a substantial portion of the radiation substantially at the first wavelength and for transmitting a substantial portion of the radiation substantially at the second wavelength; and
   a second optical means, disposed in the path of the second beam and radiation reflected from the first optical means, for reflecting a substantial portion of the reflected radiation substantially at the first wavelength and for transmitting a substantial portion of the radiation in the second beam substantially at the third wavelength.

3. The apparatus of claim 2 wherein the second optical means is further adapted for transmitting a substantial portion of the reflected radiation substantially at the second wavelength.

4. The apparatus of claim 3 which further comprises means for causing the first radiation source to provide the first beam and/or the second radiation source to provide the second beam.

5. The apparatus of claim 3 wherein the second and third wavelengths are substantially the same.

6. The apparatus of claim 5 wherein the first wavelength is substantially equal to 1.44 μm and second wavelength is substantially equal to 1.064 μm.

7. The apparatus of claim 3 wherein the first and second optical means are dichroic mirrors.

8. The apparatus of claim 1 wherein the optical means is prism means which substantially separates the radiation substantially at the first wavelength from the radiation substantially at the second wavelength from the first beam and which is disposed so that radiation substantially at the third wavelength in the second beam is combined with the substantially separated radiation substantially at the first wavelength from the first beam.

9. Apparatus for combining output from a first radiation source which provides a first beam comprised of radiation substantially at a first wavelength and substantially at a second wavelength with output from a second radiation source which provides a second beam comprised of radiation substantially at a third wavelength, the apparatus comprising:
   a first optical means, disposed in the path of the first beam, for reflecting a substantial portion of the radiation substantially at the first wavelength and for transmitting a substantial portion of the radiation substantially at the second wavelength; and
   a second optical means, disposed in the path of the second beam and radiation reflected from the first optical means, for reflecting a substantial portion of the reflected radiation substantially at the first wavelength and for transmitting a substantial portion of the radiation substantially at the third wavelength.

10. The apparatus of claim 8 wherein the second and third wavelengths are substantially the same.

11. The apparatus of claim 1 wherein the second and third wavelengths are substantially the same.

12. The apparatus of claim 9 wherein the second and third wavelengths are substantially the same.

13. The apparatus of claim 3 which further comprises optical means for coupling radiation substantially at the first wavelength reflected by the second optical means and radiation substantially at the third wavelength from the second beam transmitted by the second optical means into an optical fiber.

14. The apparatus of claim 13 wherein the second and third wavelengths are substantially the same.

15. The apparatus of claim 14 wherein the first and second radiation sources are disposed so that the paths of the first beam and the second beam are substantially parallel.

* * * * *